United States Patent [19]
Nielsen

[11] Patent Number: 6,032,408
[45] Date of Patent: Mar. 7, 2000

[54] TREE SUPPORT COLLAR

[76] Inventor: Roger B. Nielsen, 725 E. 2nd St., Meridian, Id. 83642

[21] Appl. No.: 09/020,588

[22] Filed: Feb. 3, 1998

[51] Int. Cl.[7] .................................................. A01G 7/00
[52] U.S. Cl. ...................................................... 47/42; 47/43
[58] Field of Search .................................. 47/39, 42, 43, 47/24; 446/34

[56]         References Cited

U.S. PATENT DOCUMENTS

| 4,073,090 | 2/1978 | Lucia ............................................. | 47/43 |
| 4,222,198 | 9/1980 | Napolitano et al. .......................... | 47/43 |
| 4,366,647 | 1/1983 | Daun ............................................ | 47/42 |
| 4,562,662 | 1/1986 | Ten Pas ........................................ | 47/43 |
| 4,738,050 | 4/1988 | Dickinson .................................... | 47/43 |
| 4,848,027 | 7/1989 | Skierwiderski .............................. | 47/42 |
| 4,852,299 | 8/1989 | Smoak et al. ................................ | 47/42 |
| 5,402,600 | 4/1995 | Tompkins ..................................... | 47/42 |

*Primary Examiner*—Peter M. Poon
*Assistant Examiner*—Francis T. Palo
*Attorney, Agent, or Firm*—Ken J. Pedersen; Barbara S. Pedersen

[57]         ABSTRACT

A tree trunk restraint collar for supporting young or transplanted trees or restraining established trees to a desired position. The preferred round collar is flexible and split at one place so that it may be twisted apart to be installed around the trunk. Thus placed, it is allowed to reform to its natural, circular shape. Some form of cord or wire is then looped through collar eyelets and around the outside middle of the collar, to secure the collar within its closed and circular condition at the one end of the cord and to secure the collar to support posts at the other end. The ring fits loosely around the trunk to allow growth and flow of natural fluids within the trunk. At the same time the ring guides and restrains the tree when forces such as wind, gravity, or the attraction of sunlight are exerted upon it. The device is economical to make and install and is effective in its function.

17 Claims, 8 Drawing Sheets

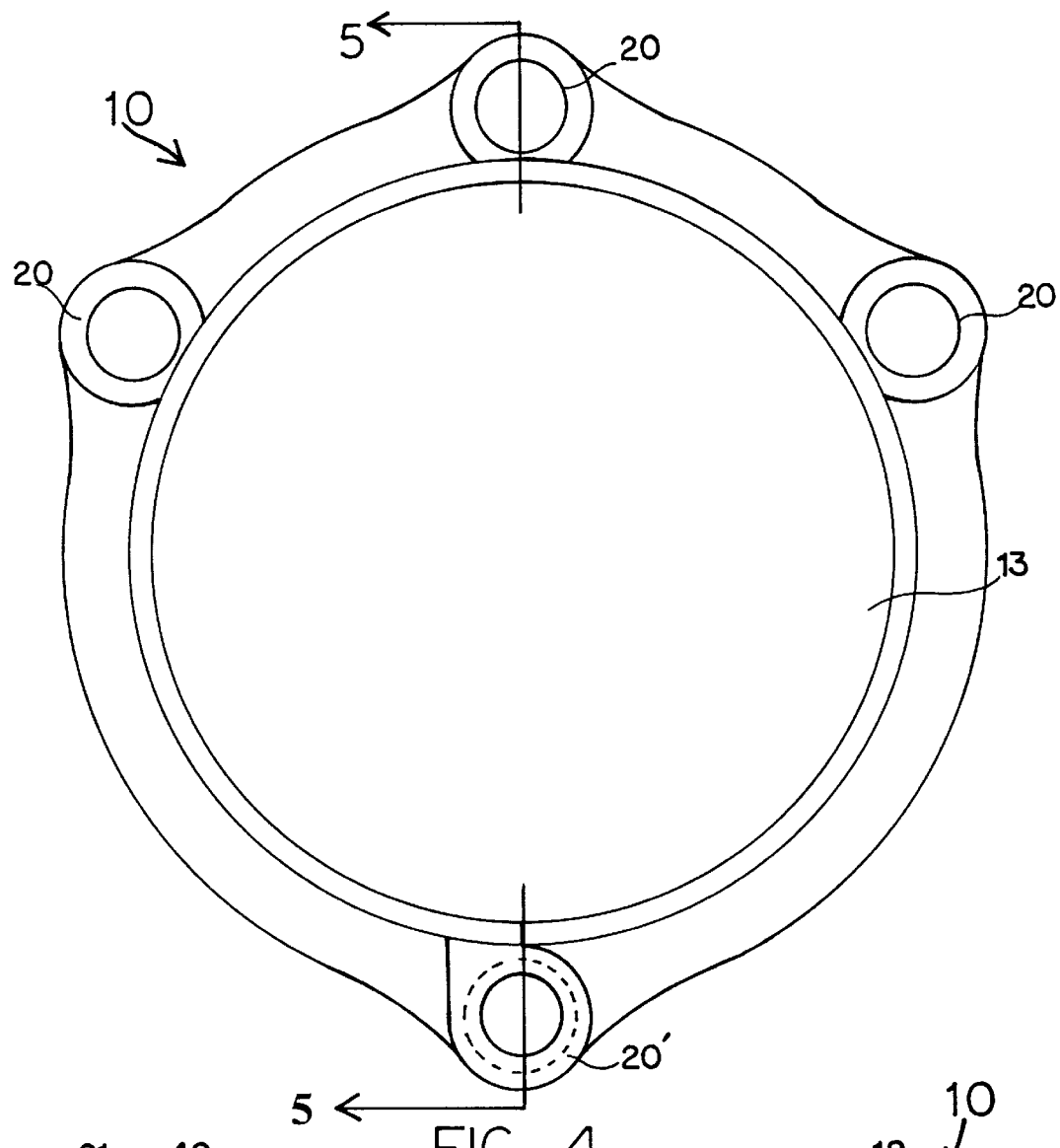
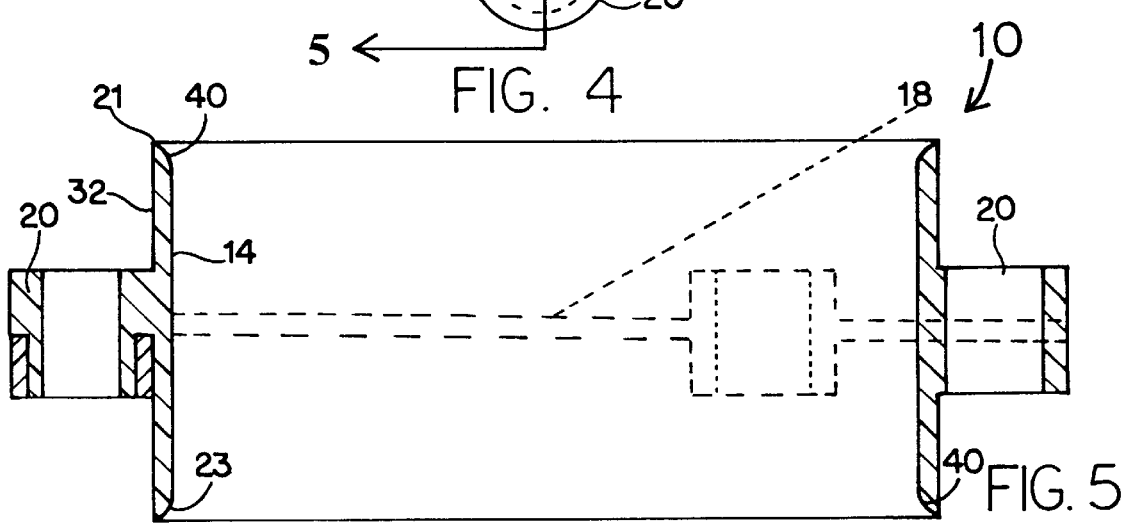

TREE SUPPORT COLLAR

BACKGROUND OF THE INVENTION

1. Field of the Invention

The invention relates to the field of tree trunk support and restraining systems. Such systems generally exist in three parts: (1) at least one anchor such as a post situated near the tree, (2) a collar capable of contact to the tree without abrading it or restricting the trees natural biologic functions, and (3) some form of cable to connect the collar to the anchor and restrain the collar, and thus the tree, in the desired direction. Such guyed support systems are necessary or desirable in growing young trees or transplanting any trees because they provide support the trees are incapable of providing themselves until their roots grow and the ground reconsolidates. The systems are also useful to established trees to help them counter such forces as wind, gravity, or the attraction of sunlight in an unwanted direction.

2. Related Art

The traditional method of supporting a transplanted tree by guy wires is to drive stakes into the ground parallel to the trunk but away from the root ball. The stakes are normally arranged on at least two opposing sides so that some form of rope or cable may be extended from each stake to the trunk and restrain it in that direction. Tension in the cable and contact with the tree are necessary at all times to prevent the cable from falling to a useless position. A cushion, typically a short length of old garden hose, is used to prevent each cable from cutting into or abrading the tree. Good practice requires the trunk be wrapped with paper or tape to further protect it from abrasion. Taller trees may be supported by cables secured to stakes at or near ground level and limbs may be guyed as well as trunks.

The traditional method provides several problems and opportunities for improvement. Devices which encircle the trunk and can be supported by opposing cables rather than tension against the tree in opposing directions are set forth in a few patents including: U.S. Pat. No. 4,073,090 to Lucia describing a self-releasing collar with three contact points; U.S. Pat. No. 4,366,647 to Daun describing a coil which expands to accommodate tree growth; and U.S. Pat. No. 5,402,600 to Tompkins describing a hinged, hard outer cylinder with a soft inner cylinder. These devices avoid direct contact of the guy ropes to the tree and distribute a single, resultant load against it.

To accommodate growth and avoid strangulation, the above-referenced patents further describe means to expand with the trunk or limb (Daun) or to automatically open (Lucia and Tompkins). Lucia additionally describes narrow contact lugs arranged parallel to tree veins to minimize vein damage. U.S. Pat. No. 4,852,299 to Smoak et al. describes an encompassing strap of "climatologically degradable material" which disintegrates after a period of time and exposure to the elements. U.S. Pat. No. 4,222,198 to Napolitano et al. describes a spring within a hose to absorb shock and yield to growth.

To avoid abrasion, related art has proposed contact to the tree by foam plastic (Tompkins), by degradable material (Smoak et al.), and by a flexible hose (Napolitano et al.). U.S. Pat. No. 4,738,050 to Dickinson describes a tree member secured within a smooth concave clamp by an elastic strap. Many other methods are described in the art.

A significant body of related art exists which addresses various aspects and problems of tree support and proposes a variety of solutions. The present invention, however, offers a new treatment of those problems which is effective and economical to manufacture, install, and maintain.

SUMMARY OF THE INVENTION

The present invention is a tree trunk or limb restraint collar. The generally round collar is flexible and discontinuous so that it may be spread or twisted open and passed over the trunk. Thus placed, the flexible, resilient collar is allowed to reform to its natural, generally circular shape. Some form of cord or wire is then looped through collar eyelets to secure the collar within its closed and circular condition at the one end of the cord and to secure the collar to support posts at the other end. The collar fits loosely around the trunk to allow growth and flow of natural fluids within the trunk. It is anticipated that a variety of sizes of collars would accommodate tree members of different diameters and their growth. In other embodiments, two semi-cylinders form the cylinder or a series of collar "links" are connected to form a generally cylindrical collar of adjustable diameter.

Within the perimeter of the preferred embodiment are formed four eyelets to accommodate closure of the collar after its placement around the tree and to properly locate cord or cable. The invention is not intended to be restricted to four eyelets; there reasonably could be more or as few as one. By wrapping cord or cable circumferentially around the collar, the collar is closed and supported in that condition. By threading cord or cable through the eyelets, the cord or cable is held to its desired position. The eyelets are arranged for the collar to be exerted against the tree in one direction or, in the case of two or more eyelets, the collar may be suspended without tree contact.

The circular interior of the collar is configured to distribute contact, and thus distribute support, over an area of the tree member relatively larger than that of the traditional cable within a hose and that of much related art. The object is to impart the directional force of the cable(s) over an area sufficient to alleviate point loading and avoid damage to the tree. Further, each end of the interior cylinder is rounded to avoid abrasion—particularly in the event the collar turns and contacts the tree member at the ends of the collar interior cylinder. A collar suspended by opposing cables connected to posts at a distance above the ground may not normally contact the tree but, rather, provide support only in event of wind or other occasional force upon it.

BRIEF DESCRIPTION OF THE DRAWINGS

FIG. 4 is a plan view of the collar in the "closed" condition.

FIG. 5 is a vertical cross-section from FIG. 4 of the closed collar including crosssectional views of two eyelets.

DESCRIPTION OF THE PREFERRED EMBODIMENTS

Figure 10:
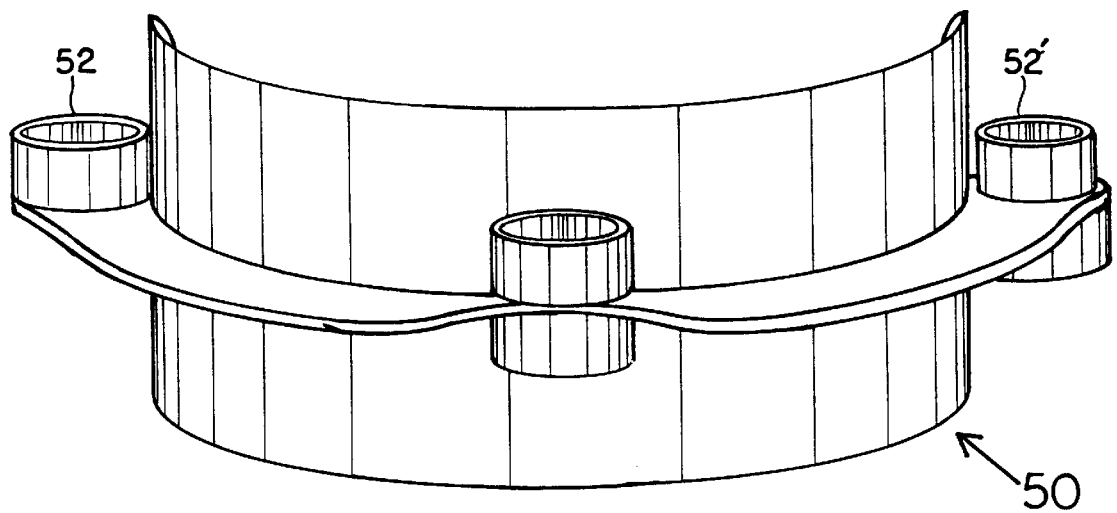
FIG. 10 illustrates a two-piece, semi-circular or semi-cylindrical embodiment.
Figure 11:
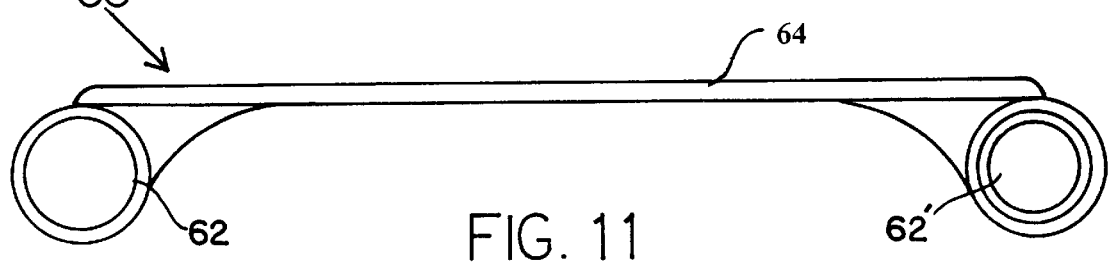
FIG. 11 illustrates a top view of one link of a multiple piece, two-eyelet, flat radius embodiment.
Figure 12:
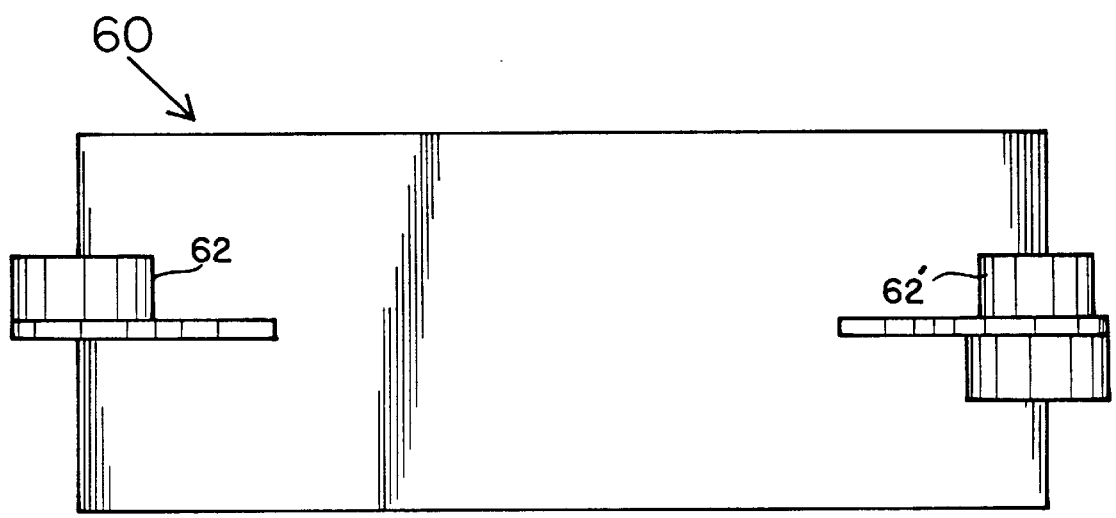
FIG. 12 illustrates a side view of one link of the multiple piece, two-eyelet, flat radius embodiment.

Referring to the Figures, there are shown several, but not the only, invented tree trunk restraint collar. Shown in FIGS. 1–9, the collar 10 is round or near-round in its main cylinder 12 and interior surface 14 so that a tree trunk or other tree member 16 may move within the interior space 13 or make occasional contact without abrasion. The exterior of the collar is essentially round, paralleling the interior design. Outboard of the cylinder 12 are four eyelets 20, 20' between and among which is formed a reinforcement ring or fin 18. The collar 10 is parted by a slit 24 from first end 21 to second end 23 in a line parallel to the cylinder axis so that it may be spread or twisted apart and passed over a trunk or limb. On the right and left of the slit 24 are right and left edges 25, 27 of the cylinder. The preferred embodiment of the invention is necessarily constructed of a flexible material such as UV stabilized polyethylene. Other embodiments, such as a two-piece, semi-cylindrical construction (FIG. 10) or a multiple piece, two-eyelet and flat radius "link" construction (FIGS. 11 and 12), could be manufactured of more rigid plastic, metal, or other materials.

Figure 1:
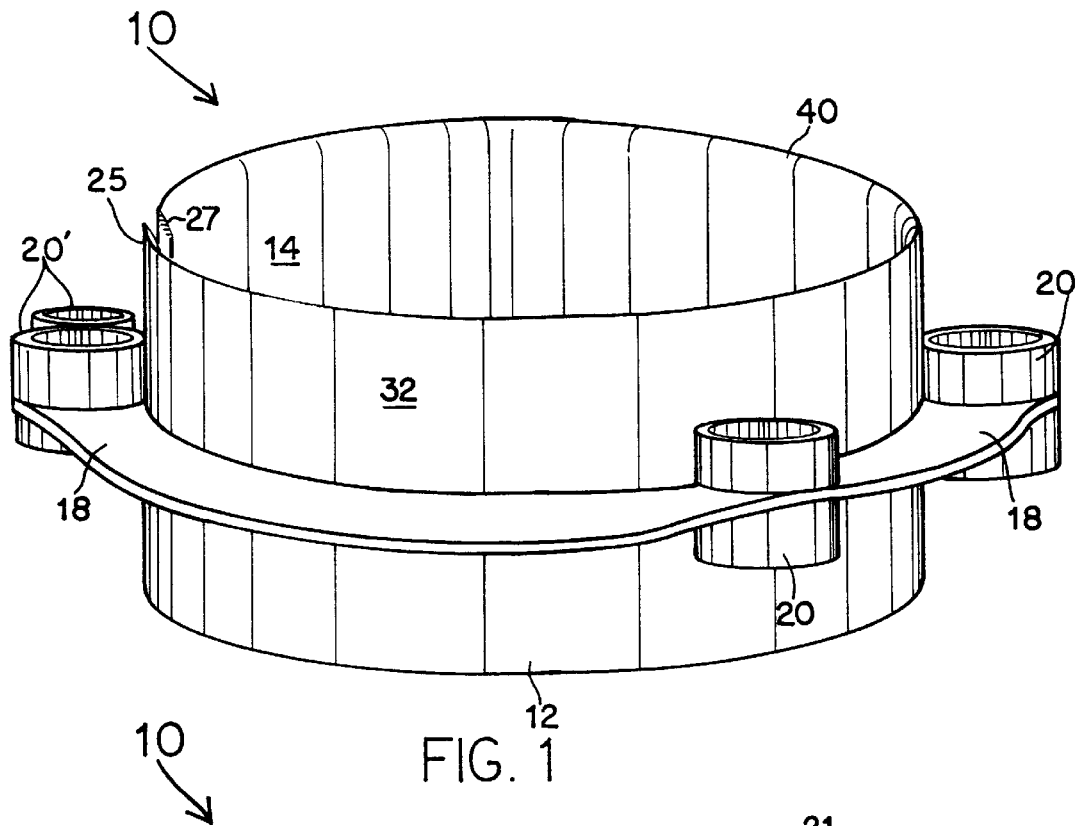
FIG. 1 is a perspective of the collar in the "open" condition.
Figure 2:
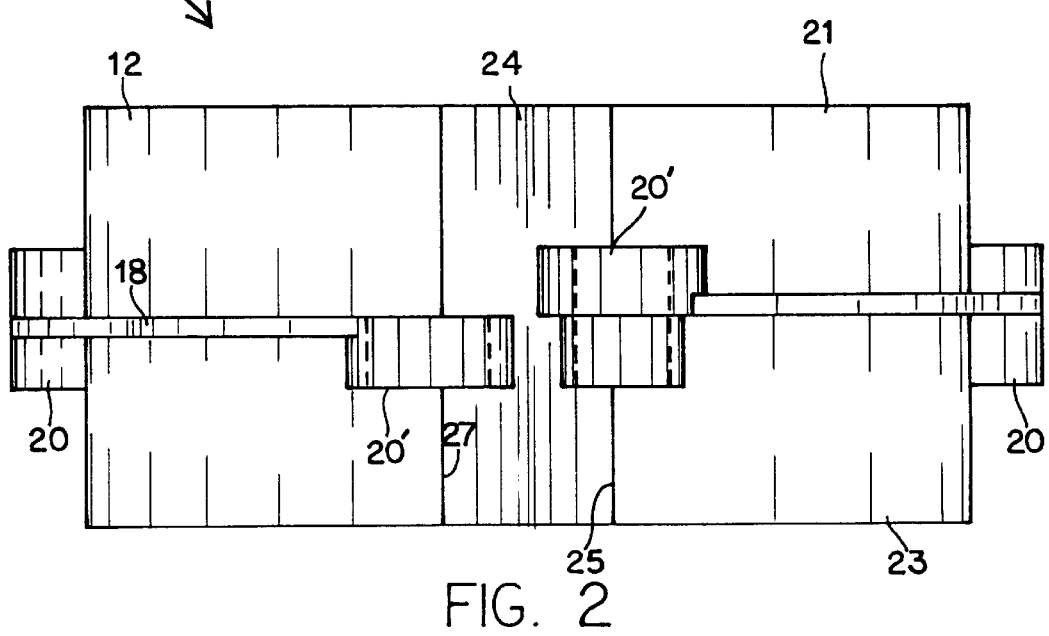
FIG. 2 is an exterior side view of the collar in the "open" or parted condition.
Figure 3:
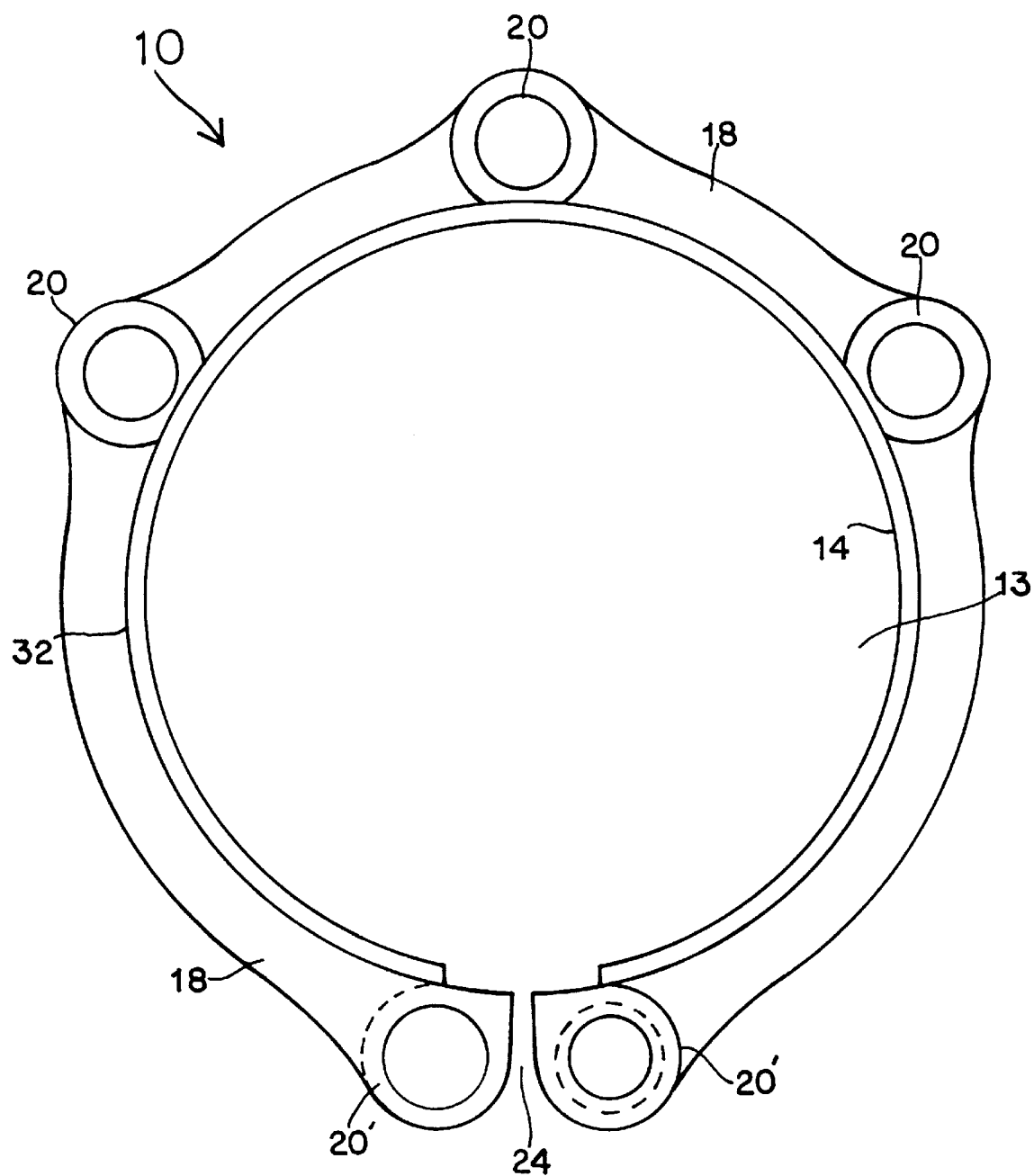
FIG. 3 is a plan view of the collar in the "open" or parted condition.
Figure 6:
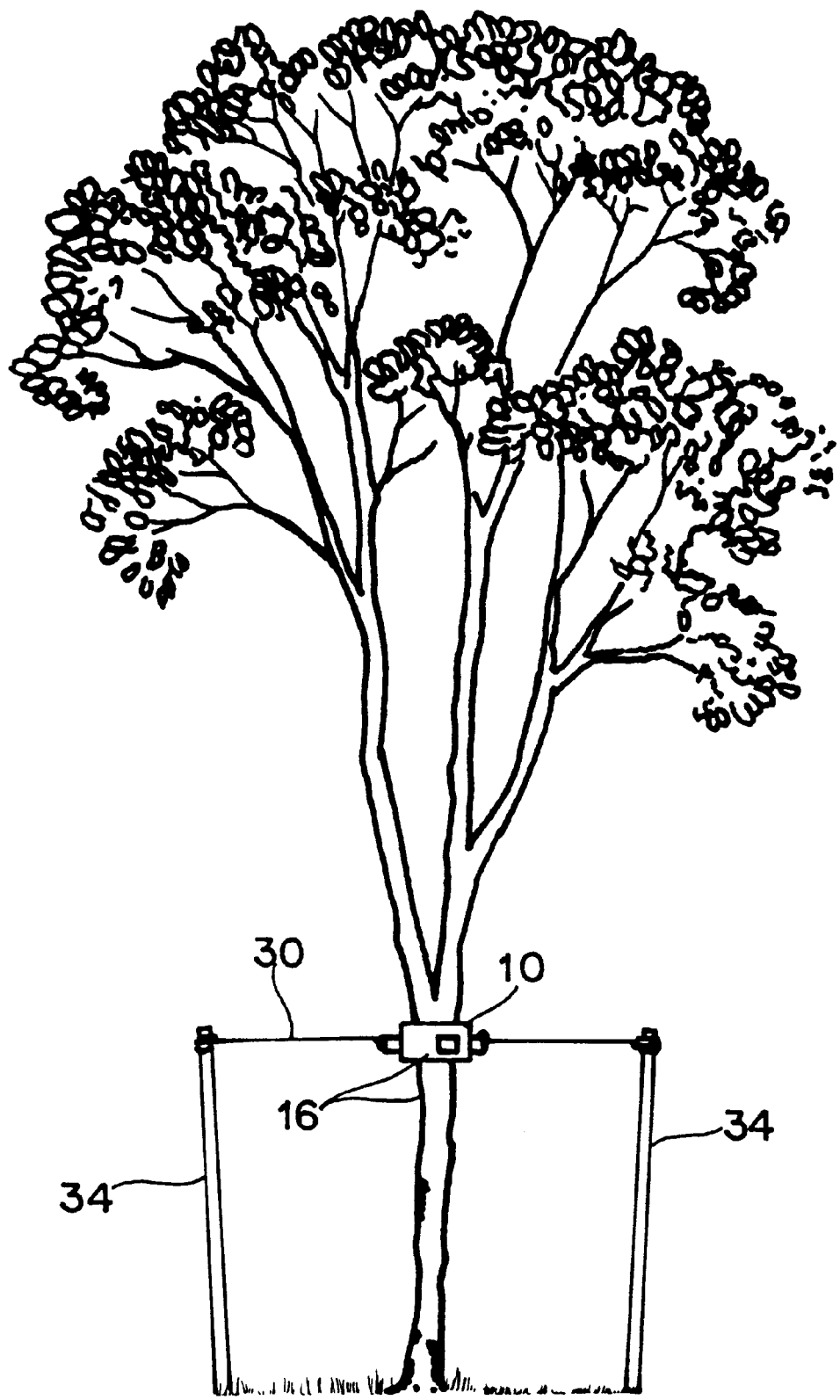
FIG. 6 illustrates a collar, which may or may not be in contact with the tree, suspended between two support posts.
Figure 7:
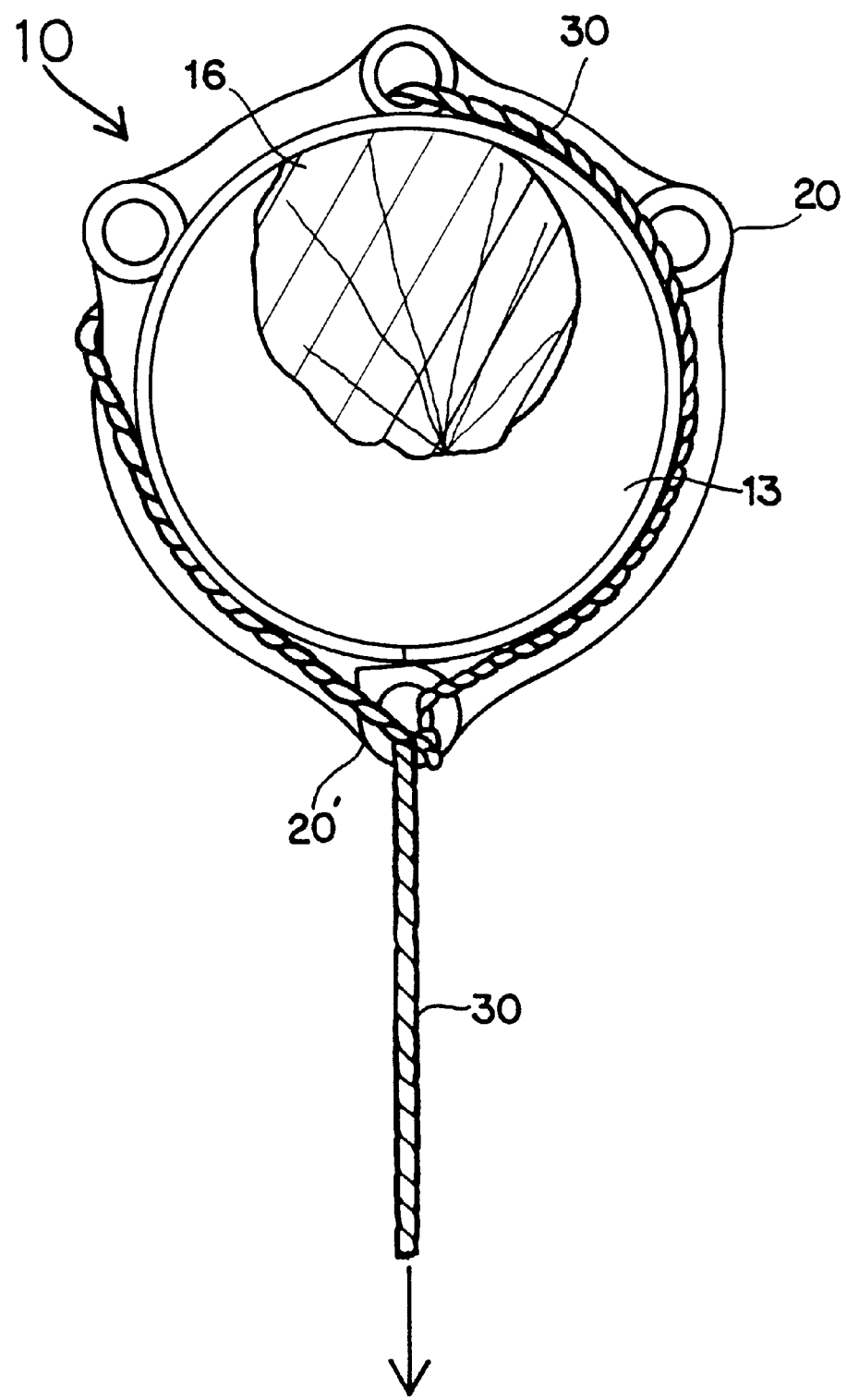
FIG. 7 is a top view of the collar, a cross-section of a supported tree member, and wrapped and threaded cord illustrating tension in a single direction.
Figure 8:
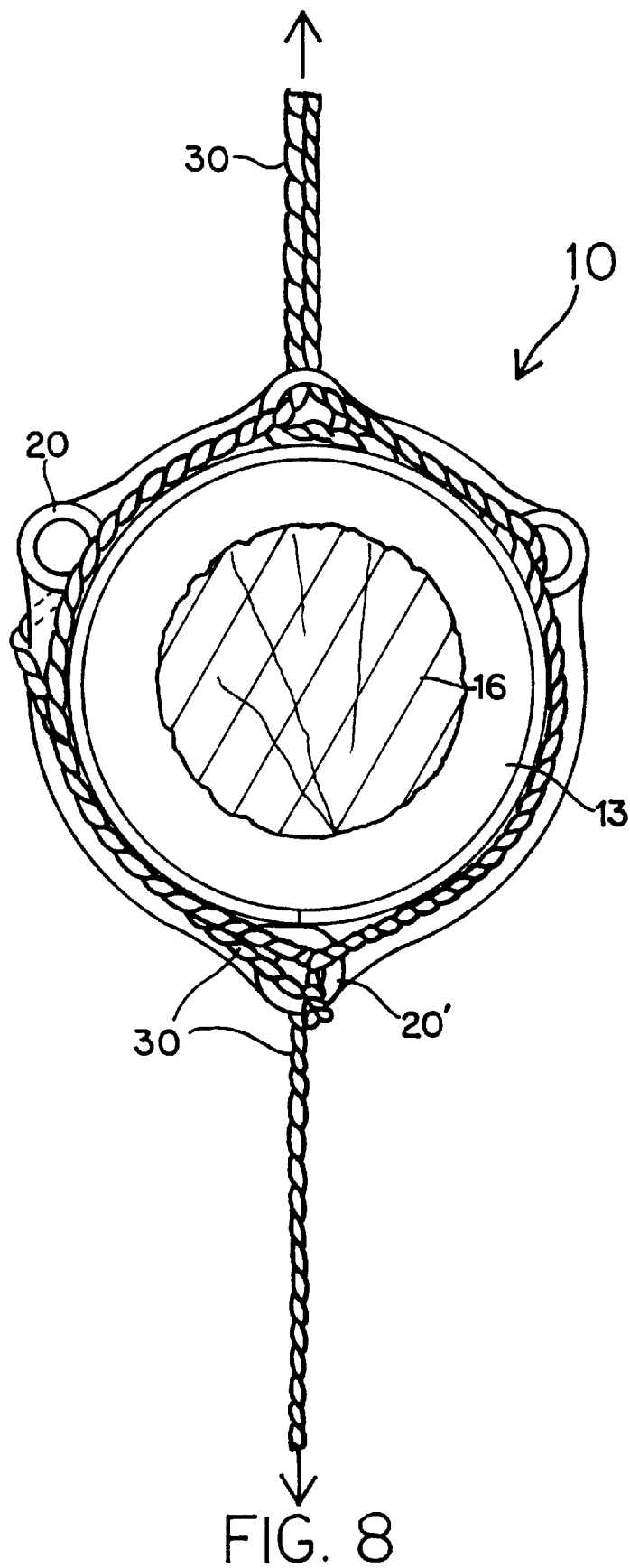
FIG. 8 is a top view of a suspended collar, a cross-section of a supported tree member, and wrapped and threaded cord illustrating cords exerting tension in two opposite directions.
Figure 9:
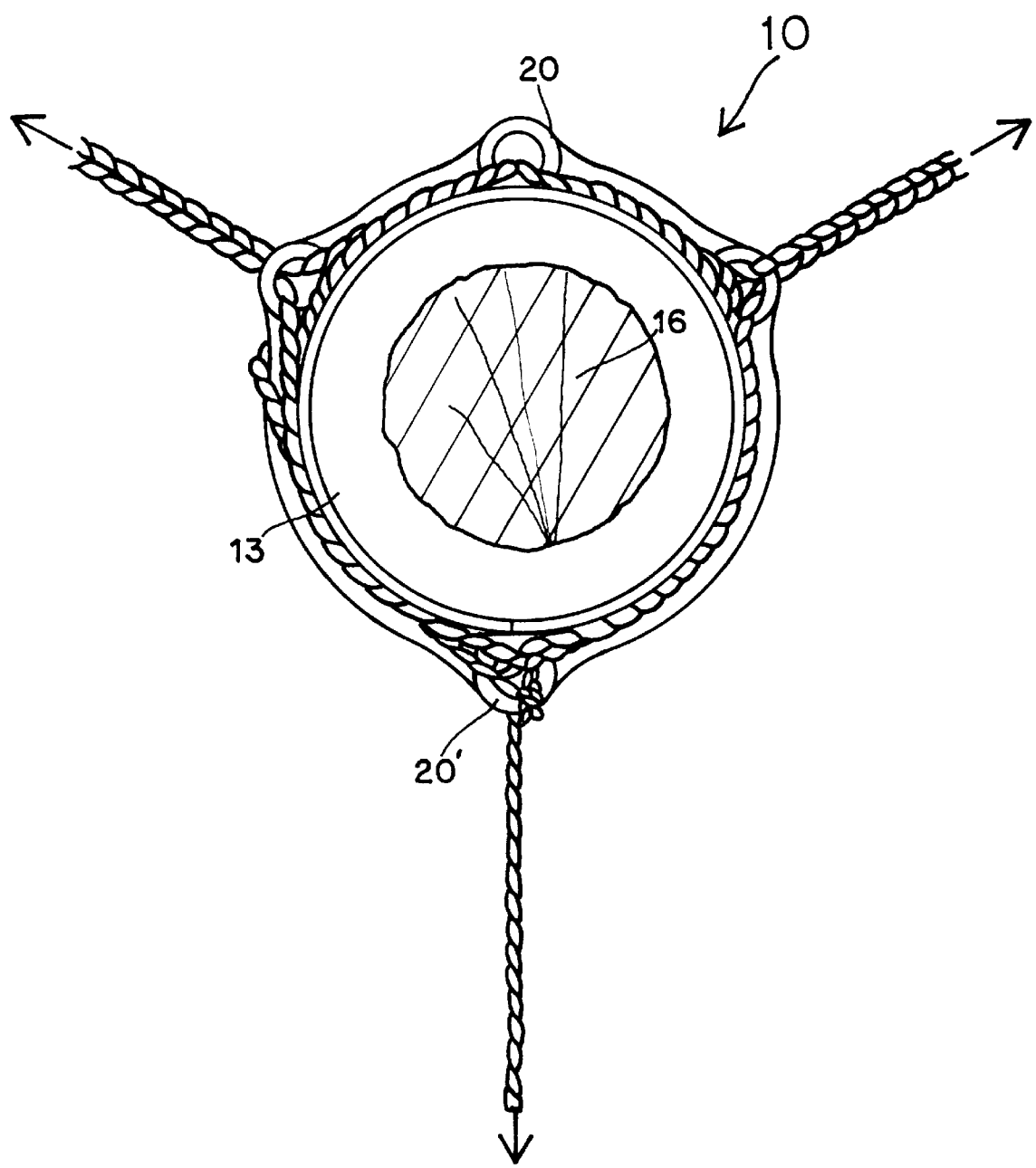
FIG. 9 is a top view of a suspended collar, a cross-section of a supported tree member, and wrapped and threaded cord illustrating cords exerting tension in three opposing directions.

As stated, the preferred collar 10 is somewhat flexible and discontinuous so that it may be spread open and passed over the trunk or limb. Thus placed, the collar 10 is allowed to reform to its preformed cylindrical shape. Some form of cord or wire guy 30 is then passed through "nesting" collar eyelets 20' and knotted to secure those eyelets together and secure the collar 10 within its closed condition. As illustrated in FIGS. 7–9, the opposite end of the guy 30 is then threaded through some or all of the consecutive eyelets in the course of wrapping it circumferentially around the central region of the exterior surface 32 of the collar and, finally, tautly secured to a support post 34 or some form of anchor. Thus wrapped, the guy 30 will not slip off the collar 10 and damage the tree. Further, the load of the guy is distributed throughout the collar and not entirely directed upon any single eyelet. The wrapped guy becomes an integral part of the system and enhances its integrity. It is particularly advantageous to avoid tying directly to the eyelets because they are vulnerable to failure over time and in very hot and cold temperatures. Preferably, each guy that is wrapped around the collar extends greater than 1800 (preferably 240–360° around the circumference).

Within the exterior surface 32 of the preferred embodiment are formed four eyelets (3 eyelets 20 plus one nested eyelet comprising two portions 20') to accommodate closure of the collar, to restrain guy cord or wire to its desired position upon the exterior of the collar, and to accommodate guying in strategic directions. It is not intended that the invention be limited to four eyelets; four eyelets may be optimum but not a number exclusive to the operation of the invention. At least one eyelet is desirable to provide means for tying the collar closed and orienting the collar in a single direction. A single guy 30 (FIG. 7) requires contact of the collar 10 with the tree and, necessarily, some degree of stress and restraint. This may or may not be desirable. If only occasional contact and guidance is preferable, two opposing guys arranged 180° apart (FIG. 8) or three opposing guys configured 120° apart (FIG. 9) will suspend the collar without reliance of contact upon the tree. The four eyelets of the preferred embodiment are specifically located to accommodate these configurations. Thus suspended, the collar is available for support if and when needed such as in the event of ground settlement or wind, snow load, or other occasional force.

The circular interior surface 14 of the collar 10 is configured to distribute support over an area of the tree member relatively larger than that of the traditional cable within a hose and that of much related art. The object is to impart the directional force of the cable(s), whether exerted continuously (FIG. 7) or occasionally (FIGS. 8 and 9), over an area sufficiently large and smooth to alleviate point loading and avoid damage to the tree. This is accomplished in three ways. First, by providing the relatively larger area. Second, by locating the eyelets 20, 20' in a pivotal position at the center of the collar cylinder so that the collar can turn to bear its broad side against the tree rather than a narrow edge. And, third, each end 40 of the interior cylinder surface 14 is rounded to ease loading and avoid abrasion. The rigid collar also minimizes strangulation in its bearing configuration (FIG. 7) by distributing more force (relative to the traditional method) in a vertical direction and less force in a circumferential direction. In its non-bearing configurations (FIGS. 8 and 9), the collar 10 fits loosely around the trunk, leaving empty space around the entire trunk circumference, to allow growth and flow of natural fluids within the trunk, thus avoiding strangulation completely. It is anticipated that a variety of sizes of collars would accommodate tree members of different diameters and their growth. Preferably, no padding or other insert member is placed between the interior surface of the cylinder and the tree member, and the hard, broad interior surface is the only surface that contacts the tree and, then, only occasionally.

The two-part "semi-circle" or "semi-cylindrical" embodiment of the invention (FIG. 10) operates very much like the preferred embodiment. The principal difference is that it is designed to be assembled of two identical pieces 50 which can be cast from the same mold. In operation, the two parts would be assembled around the tree member rather than spread open and allowed to reclose. Two pairs of "nesting" eyelets 52, 52', one pair at each end of the semi-circle, would then be fit together and tied closed rather than only a single pair as in the preferred embodiment. To accommodate single mold manufacture and identity of the two parts, the four eyelets are located 90° apart. Because flexibility is not necessary to the semi-circle construction, this embodiment may be manufactured out of polyethylene, as before, or more rigid plastic, metal, or other materials. Construction and operation of this embodiment is similar to the preferred embodiment in all other aspects.

The "link" belt construction (FIGS. 11 and 12) also is designed to be cast from a single mold and, thus, the pieces are identical. Links 60 can be connected by "nesting" eyelets 62, 62' similar to those of the other embodiments and similarly tied closed. Any number of links necessary can be connected to attain a desired circumference. Because all eyelets 60, 62' are "nesting" eyelets of two different links, all link eyelets must be laced together by cord or wire, whether or not they are subsequently extended to anchors. Unlike the circular and semi-circular embodiments, the interior bearing surface of links 64 is preferably straight and flat because no single circumference can be anticipated. Thus it may be desirable for the flat section to be somewhat flexible. Consequently, the stiffening fin of the other embodiments is purposely omitted. The linked embodiment of the invention will be incapable of forming a rigid circle in some diameters and will, therefore, be required to be strained against the object of its support to maintain the desired position and purpose.

Although the preferred embodiment includes nested or single eyelets that are cylindrical and are molded integrally into the collar, alternative eyelets may by used, including any attachment for a cord or wire, integral or not integral to the collar body.

Although this invention has been described above with reference to particular means, materials and embodiments, it is to be understood that the invention is not limited to these disclosed particulars, but extends instead to all equivalents within the scope of the following claims.

I claim:

1. A tree member support collar comprising:
   a cylinder having a first and second end, an interior surface defining an interior space, an exterior surface, and a slit extending from said first end to said second end for opening said cylinder for placement of the cylinder around a tree member, the cylinder having a left edge and a right edge to the left and right, respectively, of the slit, and
   a connector attached to the exterior surface of the cylinder securing the left and right edges of the cylinder in a closed condition around the tree member,
   wherein the interior surface is smooth, substantially flat in the axial direction, curved in the radial direction, and radiused at the cylinder first and second ends for presenting a broad, smooth, undamaging surface for contacting and supporting said tree member; and wherein said interior surface comprises no inward protrusions,
   wherein the support collar comprises no insert member within said interior space between the support collar and the tree member, and
   a plurality of eyelets extending outward from the exterior surface of the cylinder for being available to at least one guy threaded through two or more eyelets and wrapped circumferentially around the collar, whereby said guy is kept near the center of the exterior surface of the collar, and wherein one of said eyelets is also said connector.

2. A tree member support collar as in claim 1 further comprising a plurality of eyelets extending outward from the exterior surface of the cylinder wherein two of said eyelets are located 180° apart and three eyelets are located 120° apart for receiving two and three opposing guy wires, respectively.

3. A tree member support collar as in claim 1, wherein:
   said cylinder comprises two semi-cylindrical pieces each having a first and second edge, wherein the first edge of a first of said pieces is said left edge and the second edge of the second of said pieces is said right edge;
   said left edge and said right edge are detachably secured together by said connector; and
   the second edge of the first piece is detachably secured to the first edge of the second piece to form said cylinder.

4. A tree member support collar as in claim 1, wherein said cylinder comprises a plurality of links detachably secured together to form the cylinder.

5. A guy system for supporting a tree member having a generally cylindrical outer surface, a longitudinal axis, and a diameter, the guy system comprising:
   a support collar comprising a cylinder having a first and second end, an exterior surface, a slit in the cylinder for allowing the cylinder to be placed around the tree member, and an interior surface defining an interior space for coaxially receiving the tree member;
   a connector for securing the cylinder in a closed position around the tree member;
   a plurality of eyelets, spaced around and extending from the cylinder exterior surface, wherein one of said eyelets is also said connector; and
   a first guy received in at least one of said eyelets and extending circumferentially around the exterior surface of the cylinder, the guy having an end for attachment to a post.

6. A guy system as in claim 5, further comprising a plurality of guys, each guy received in at least one of said eyelets, and each guy extending circumferentially around the exterior surface of the cylinder.

7. A guy system as in claim 5, wherein three of said eyelets are spaced at 120° from each other.

8. A guy system as in claim 5, wherein two of said eyelets are spaced at 180° from each other.

9. A guy system as in claim 5, wherein the first guy extends about 360° around the exterior surface.

10. A guy system as in claim 6, wherein each guy extends greater than 180° around the exterior surface.

11. A tree member support system comprising:
    a tree member having a generally cylindrical outer surface, a longitudinal axis, and a diameter;
    a support collar comprising a cylinder having a first and second end, an exterior surface, a slit in the cylinder for allowing the cylinder to be placed around the tree member, and an interior surface defining an interior space generally coaxially receiving the tree member;
    a connector for securing the cylinder in a closed position around the tree member;
    a plurality of eyelets spaced around and extending from the cylinder exterior surface, wherein one of said eyelets is also said connector; and
    a first guy and a second guy, each guy received in at least one of said eyelets and having an end for attachment to a post;
    wherein the cylinder has a diameter greater than the diameter of the tree member; and
    wherein the first guy and the second guy extend from the support collar in generally opposing directions, so that the support collar is supported around the tree member and there is empty space between the support collar and the tree member outer surface around the entire circumference of the tree member.

12. A tree member support system as in claim 11, wherein the first and second guy are each received in at least one of said eyelets, and each guy extends circumferentially around the exterior surface of the cylinder.

13. A tree member support system as in claim 11, wherein three of said eyelets are spaced at 120° from each other, the support system further comprises a third guy, and said first, second, and third guys are each received in at least one of said three eyelets and extend outward from the support collar at 120° from each other.

14. A tree member support system as in claim 11, wherein two of said eyelets are spaced at 180° from each other, and said first guy and said second guy are received in said two eyelets and extend outward from the support collar 180° from each other.

15. A tree member support system as in claim 13, wherein said first, second and third guys each extend circumferentially around the exterior surface of the cylinder greater than 180°.

16. A tree member support system as in claim 14, wherein said first and second guys each extend circumferentially around the exterior surface of the cylinder greater than 180°.

17. A tree member support system as in claim 11, wherein:

the interior surface of the cylinder is smooth, substantially flat in the axial direction, curved in the radial direction and radiused at the cylinder first and second ends for presenting a broad, smooth, undamaging surface for contacting an supporting said tree member;

the interior surface comprises no inward protrusions; and the tree member support system comprises no padding between the cylinder interior surface and the tree member outer surface.

* * * * *

UNITED STATES PATENT AND TRADEMARK OFFICE
CERTIFICATE OF CORRECTION

PATENT NO : 6,032,408
DATED : March 07, 2000
INVENTOR(S): Roger B. Nielsen

It is certified that error appears in the above-identified patent and that said Letters Patent are hereby corrected as shown below:

Column 3, line 55, "1800" should read --180-- wherein the substitution should not be bolded.

Claim 17, line 3, "an" should read --and--.

Signed and Sealed this

Twenty-second Day of May, 2001

Attest:

NICHOLAS P. GODICI

Attesting Officer

Acting Director of the United States Patent and Trademark Office